(12) United States Patent
Debergh

(10) Patent No.: US 12,538,945 B2
(45) Date of Patent: Feb. 3, 2026

(54) METHOD AND SYSTEM FOR IDENTIFYING SMOKING ARTICLES

(71) Applicant: JT International SA, Geneva (CH)

(72) Inventor: Patrick Debergh, Cressier (CH)

(73) Assignee: JT International SA (CH)

(*) Notice: Subject to any disclaimer, the term of this patent is extended or adjusted under 35 U.S.C. 154(b) by 616 days.

(21) Appl. No.: 17/927,520

(22) PCT Filed: May 17, 2021

(86) PCT No.: PCT/EP2021/063029
§ 371 (c)(1),
(2) Date: Nov. 23, 2022

(87) PCT Pub. No.: WO2021/239494
PCT Pub. Date: Dec. 2, 2021

(65) Prior Publication Data
US 2023/0240377 A1    Aug. 3, 2023

(30) Foreign Application Priority Data
May 28, 2020   (EP) .................................... 20177031

(51) Int. Cl.
*A24F 40/53*   (2020.01)
*A24C 5/01*   (2020.01)
(Continued)

(52) U.S. Cl.
CPC ............... *A24F 40/53* (2020.01); *A24C 5/01* (2020.01); *A24C 5/34* (2013.01); *A24D 1/20* (2020.01);
(Continued)

(58) Field of Classification Search
None
See application file for complete search history.

(56) References Cited

U.S. PATENT DOCUMENTS

| 2014/0202474 A1 | 7/2014 | Peleg et al. |
| 2016/0278431 A1 | 9/2016 | Liu |

(Continued)

FOREIGN PATENT DOCUMENTS

| CN | 109222246 A | 1/2019 |
| JP | 2018527894 A | 9/2018 |

(Continued)

OTHER PUBLICATIONS

Nagpal B. et al., "Minutiae vs. Correlation: Analysis of Fingerprint Recognition Methods in Biometric Security System" International Journal of Engineering and Advanced Technology, ISSN 2249-8958, Oct. 2015, pp. 82-86, vol. 5 Issue 1.

(Continued)

*Primary Examiner* — Katherine A Will
(74) *Attorney, Agent, or Firm* — Lerner David LLP

(57) ABSTRACT

A method for authenticating an aerosol-generating article includes the steps of imaging and processing at least one consumable section of the aerosol-generating article, correlating a current digitalized image with a reference image registered during production of the article, and determining, based on correlation results and a predetermined correlation criterium, if the article is a genuine product. An aerosol-generating system includes an aerosol-generating device having a 2D and/or 3D imager that includes image processing and image correlation means for imaging and analysing the stochastic arrangement of the individual substrate parts of the aerosol-generating article. A machine for producing aerosol-generating articles includes an in-line imaging system.

16 Claims, 8 Drawing Sheets

(51) Int. Cl.
 *A24C 5/34*    (2006.01)
 *A24D 1/20*    (2020.01)
 *A24F 40/20*    (2020.01)
 *A24F 40/51*    (2020.01)
 *B65B 19/28*    (2006.01)
 *B65D 75/52*    (2006.01)
 *B65D 85/08*    (2006.01)
 *G06T 7/00*    (2017.01)
 *G06T 7/73*    (2017.01)

(52) U.S. Cl.
 CPC .............. *A24F 40/20* (2020.01); *A24F 40/51* (2020.01); *B65B 19/28* (2013.01); *B65D 75/522* (2013.01); *B65D 85/08* (2013.01); *G06T 7/001* (2013.01); *G06T 7/74* (2017.01); *G06T 2207/30108* (2013.01)

(56) References Cited

U.S. PATENT DOCUMENTS

2016/0302488 A1   10/2016   Fernando et al.
2019/0008206 A1   1/2019   Gimkiewicz et al.

FOREIGN PATENT DOCUMENTS

| WO | 2017221126 A2 | 12/2017 |
| WO | 2018050701 A1 | 3/2018 |
| WO | 2018185722 A1 | 10/2018 |
| WO | 2019129378 A1 | 7/2019 |

OTHER PUBLICATIONS

International Search Report for Application No. PCT/EP2021/063029 mailed Jul. 1, 2021, pp. 1-5.

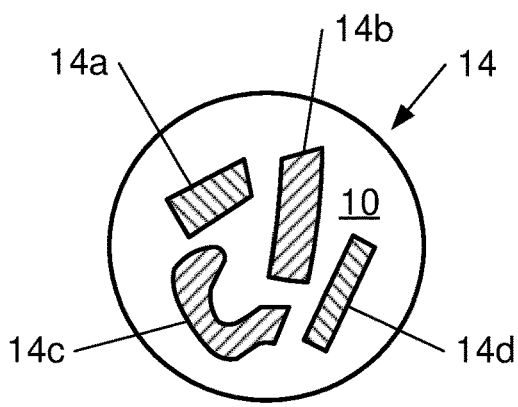
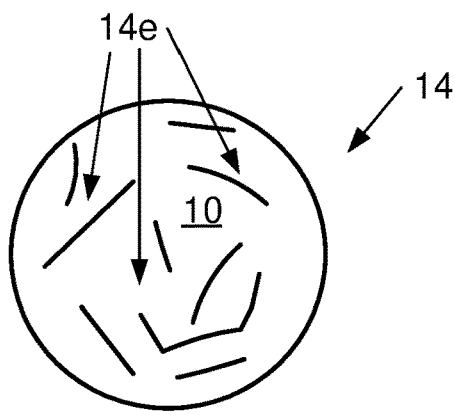
Fig. 11          Fig. 12
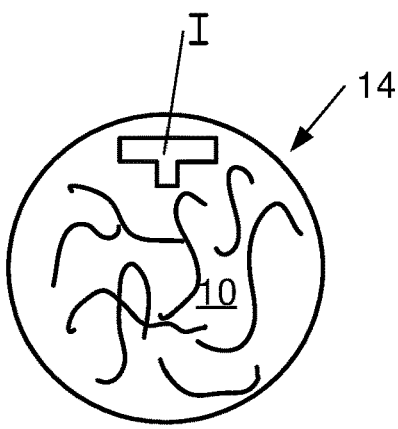
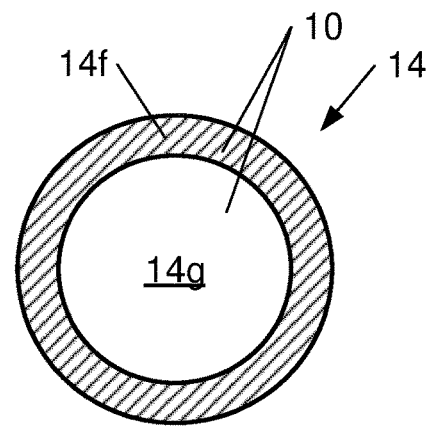
Fig. 13          Fig. 14
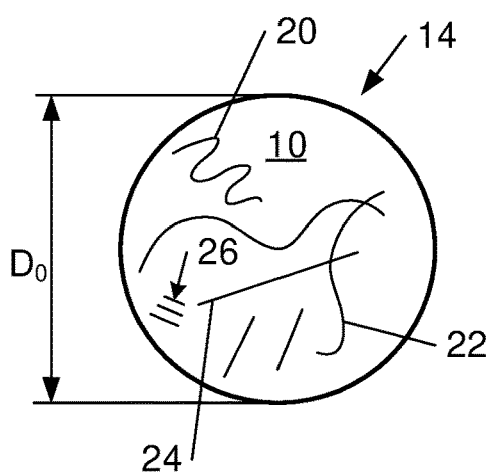
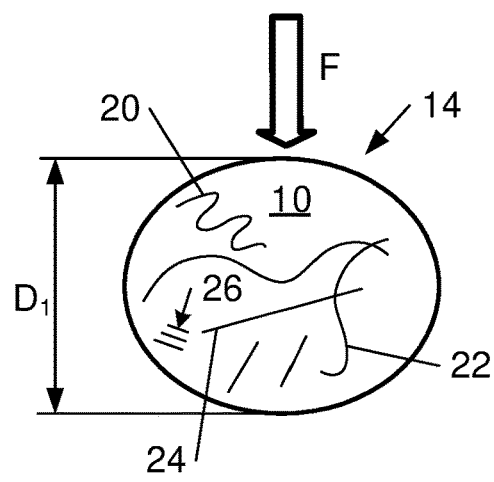
Fig. 15          Fig. 16

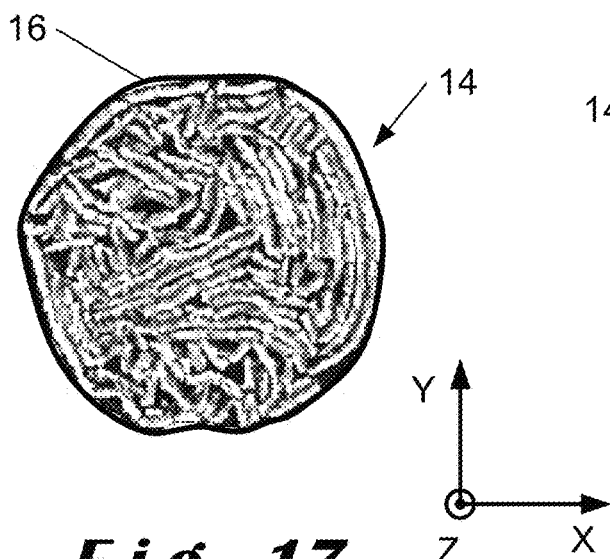
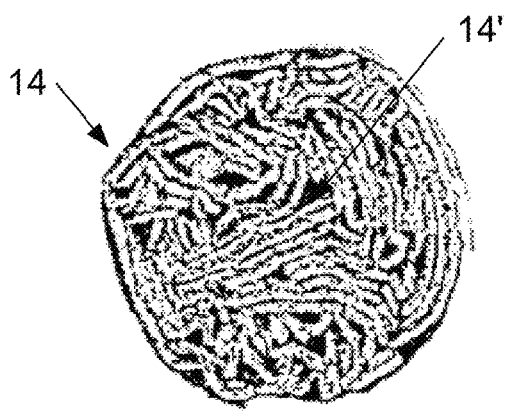
*Fig. 17*     *Fig. 18*
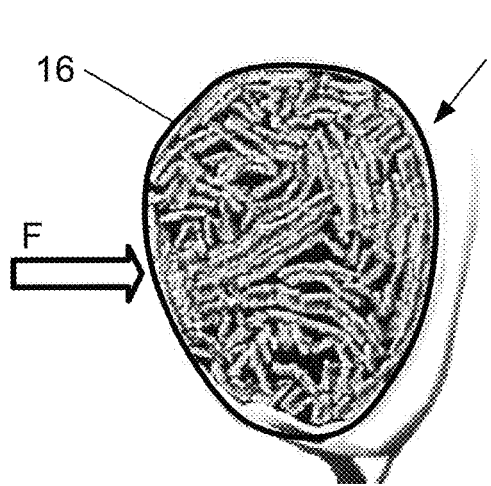
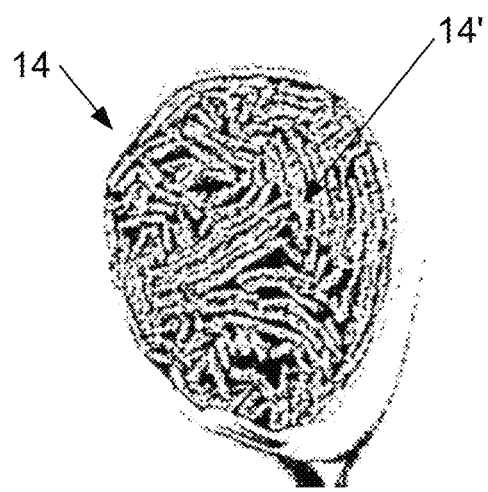
*Fig. 19*     *Fig. 20*
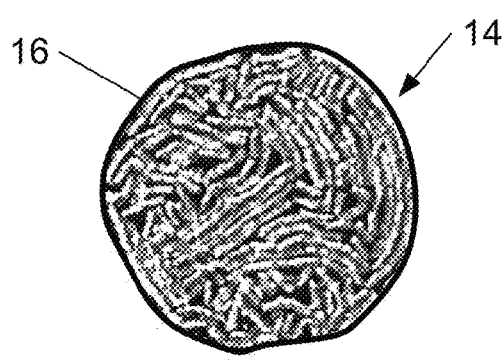
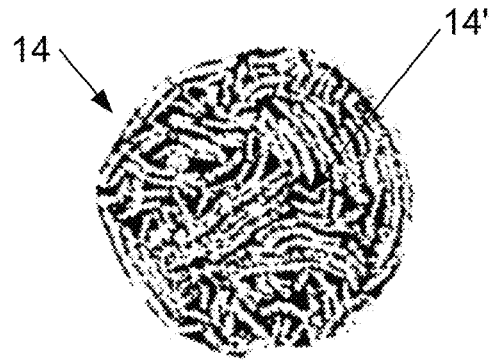
*Fig. 21*     *Fig. 22*

METHOD AND SYSTEM FOR IDENTIFYING SMOKING ARTICLES

CROSS-REFERENCE TO RELATED APPLICATIONS

The present application is a national phase entry under 35 U.S.C. § 371 of International Application No. PCT/EP2021/063029, filed May 17, 2021, published in English, which claims priority to European Application No. 20177031.0 filed May 28, 2020, the disclosures of which are incorporated herein by reference.

TECHNICAL FIELD OF THE INVENTION

The present invention relates to the field of tobacco, in particular to reconstituted tobacco as well as aerosol-generating articles. The present invention further relates to smoking devices, especially to an electrically heated e-liquid system or an electrically heated aerosol-generating system.

BACKGROUND OF THE INVENTION

Electronic cigarettes based on aerosol-generating consumable articles have gained popularity in the recent years. There are mainly two types: liquid vaporizers and heated tobacco inhaler devices. Heated tobacco inhaler devices are referred to as "heat-not-burn" systems (HNB). They provide a more authentic tobacco flavour compared to electronic cigarettes, which deliver an inhalable aerosol from heating of a liquid charge comprising aerosol formers, flavorants, and often nicotine. The HNB system's working principle is to heat a tobacco material comprising an aerosol-forming substance (such as glycerine and/or propylene glycol) which vaporises during heating and creates a vapour that extracts nicotine and flavour components from the tobacco material. The tobacco substance is heated to between 200 and 400° C., which is below the normal burning temperatures of a conventional cigarette. The inhaler device is typically a hand-held heater, which is configured to receive rod-shaped consumable articles.

Illicit trade of aerosol-generating articles, be it standard cigarettes, e-liquids, or HNB articles, is a problem, as counterfeit articles in particular may be of inferior quality or, in the case of e-liquids or HNB consumable articles, may not be suited to a determined smoking system. In order to identify if an aerosol-generating consumable article is an authentic one, a code or equivalent marking containing information about the article may be arranged onto an outer surface of the article, for it to be detected in use or prior use with a certain device. This allows to check for authenticity of the consumable article and in case of negative check, to power off the heating system with which it is used. To provide accurate authentication of a code on a consumable article such as an HNB article, the recognition probability should be very high so that suitable articles will not be rejected. However, existing indicia are limited by the low density of information that may be contained in them, and most known indicia rely on classic codes such as 1-dimensional or 2-Dimensional barcodes that may be easily be copied without using specific optical instruments, for example by simply visualizing the code by the human eye.

Various attempts at providing authenticatable aerosol-generating articles have been proposed in the prior art already. For instance, US20190008206A1 discloses a smoking article comprising an indicium on an outer surface of the smoking article and represents a type of smoking article and may be in the form of pattern or one/two-dimensional barcode. The indicium includes different grey levels that can be generated by printing in dots which have smaller size. Such indicium is easily detectable and reproducible and may contain only a small density of information, or to be provided with an unacceptably large size. The system described in US20190008206 A1 relies on printed indicia which optical properties have to match the LEDs used in the sensor module, such as having specific infrared absorption bands. The fact that an indicium has to be printed on an articles, as an additional step, makes the production process complicated and there is also an issue on the stability of inks in a harsh environment such as the one near to a heater as required in an aerosol-generating device.

In US20160302488A1, a smoking article is described comprising an indicium on an outer surface of the smoking article. The indicium may be in the form of one/two dimensional barcodes. The code comprises an identifiable spectroscopic signature but requires the application of a layer by a spray and requires a spectroscope. Also, the signature produced by a spectrum depends on the concentration that may be between 1 ppm and 1000 ppm, the precision of which is difficult to control. A taggant based on a spectroscopic signature is also linked to a spectroscopic measurement and interpretation and calibration issues that may make the taggant not very reliable and there may be issue related to the stability of such a taggant. Adding a spray layer during the manufacturing makes the process considerably more complicated as chemicals have to be handled and applied in a controlled manner.

In WO 2019129378A1 an aerosol-generating consumable article is described for an inhaler comprising an indicium containing information about a consumable. The indicium is formed from a heat-sensitive composition. The stability of such type of indicium is questionable as a consumable article is used in harsh conditions. Also, the indicium is in the form of a simple readable code that is easily visible to the human eye and the code can thus be easily copied and would have little use as an anti-counterfeit taggant.

There is thus a need for an improved technique to allow authentication of aerosol-generating articles such as HNB, vaping and smoking articles. In particular, authentication based on codes that comprise a much higher information density would be preferable to improve authentication quality and harden counterfeiting of the articles. Furthermore, there is a need for authentication methods that are much simpler than all the indicia of prior art and which do not require the addition of printed or glued layers, or require an incorporated element such as an additional support onto a consumable article. Also, the use of chemicals, in the form of liquids or gases, to make an indicium, have to be avoided during the manufacturing process of a consumable article.

SUMMARY OF THE INVENTION

The inventors of the present invention have found solutions to the above-discussed problems by providing an authentication method that does not require the use of added or incorporated indicia onto or into aerosol-generating consumable products. The proposed solution is based on the imaging and recognition of the stochastic arrangement of the constituents of the consumable part of aerosol-generating articles which allow to rely on inherent and complex geometrical properties of the aerosol-generating articles, allowing to provide an inherent available reference by which a consumable may be recognized at its consumption. This allows to provide a cheap and extremely secure individual recognition of aerosol-generating consumables. Indeed, it would be extremely difficult to mimic and replicate a stochastic arrangement of the substrate of an aerosol-generating article, allowing a security level that is as secure as in the case of human fingerprint detection.

In a first aspect the invention relates to a method for authenticating an aerosol generating-article that comprises a consumable substrate formed of individual substrate parts arranged in a stochastic arrangement in at least one consumable section of said aerosol-generating article, the method comprising the steps of:
  a) providing an imager comprising image processing means and image correlation means,
  b) imaging the consumable substrate in said at least one consumable section of the aerosol-generating article to form a 2D and/or 3D image of the consumable substrate therein by said imager,
  c) processing, by said image processing means, said 2D and/or 3D image to form a digitalized 2D and/or 3D image representative of the stochastic arrangement of the individual substrate parts of said consumable substrate, said image comprising characteristic optical information of the stochastic arrangement of the individual substrate parts at said consumable section
  d) correlating, by said image correlation means, said current digitalized image with a reference image of the said consumable substrate in said consumable section registered during production thereof, said reference image comprising also characteristic optical information of the stochastic arrangement of the individual substrate parts at said consumable section,
  e) determining, based on the previous correlation results and a predetermined correlation criterium, if the aerosol generating article is a genuine product.

The steps of imaging and of the image processing method of the invention allow to provide a simple and very reliable method that can be implemented easily in an aerosol-generating machine and in an aerosol-generating device.

In an embodiment the imager is provided in a cavity of an authentication device, said cavity being defined by a cavity opening and a cavity end opposite to said opening. The aerosol-generating article is introduced in the cavity such that said consumable section is positioned in proximity of said imager. By placing an imager in proximity of the cavity end not much place is required for the imager. The imager may therefor be small and does not require a big optical aperture as an illuminating light source may be provided in proximity of the imager so as to illuminate the extremity of an article introduced into the cavity.

In an embodiment the authentication device is an aerosol-generating device and the cavity is a heating cavity of said aerosol-generating device. The fact that the imager is arranged to an end of the cavity allows to avoid any heating damages to the imager during consumption of the article.

In an embodiment the aerosol-generating article has an elongated shape with a proximal end and a distal end, said consumable section comprising the distal end, and wherein the 2D and/or 3D image of the consumable substrate is an image of said distal end of the consumable section of the article. Articles having an elongated shape allow to provide a simple arrangement of an imager because such imager may be arranged in proximity of said cavity end.

In an embodiment the consumable section has an adhesive seam presenting a seam end portion at said distal end, the method comprising the further steps of:

detecting the angular position Θ of said seam end portion,
  using the detected angular position Θ of said seam end portion to provide an angular corrected image of the distal end of said consumable.

The advantage of exploiting the imaging of the angular location of a seam or glue or bond end is to enhance considerably the speed of recognition and correlation because an angular reference is provided. This avoids having to rely on image processing algorithms to find the correct angular alignment, which requires a greater image processing and correlation time.

In an embodiment said consumable substrate comprises tobacco, in particular tobacco cut-filler and/or reconstituted tobacco. Tobacco is particularly easy to detect with the system and method of the invention because the sizes of the constituents are typically fibers or cut-filler parts that have sub-mm sizes, typically between 0.1 to 0.5 mm. The device and method of the invention allows also to detect micro-sized details of tobacco fibers which may be spaghetti-like forms or particles or random shaped parts. Individual tobacco fibers may have micros-sized surface structures that may be detected and exploited in the image correlation method of the invention In an embodiment the consumable substrate comprises an insert, the method comprising a step of identifying the presence and the 2D orientation of said insert at said distal end. The advantage of providing an insert inside the aerosol-generating tobacco is to provide a specific shape and/or position of its end at the extremity of the consumable portion of a consumable. Therefore, exploiting its imaging and its angular location of a seam or glue or bond end allows to enhance considerably the speed of recognition and correlation because a well-defined shape and/or angular reference is provided on purpose of the image correlation process.

In an embodiment said insert is a conductive thread arranged in or on said at least one layer of said consumable. Using a conductive thread allows to provide a further security level as it makes the articles even more complicated to counterfeit. Furthermore, the imaging correlation process as described here may be combined by an additional detection that relates to an electrical detection of the presence of a conductive thread.

In an embodiment said characteristic optical information comprises UV and/or visible and/or infrared transmission and/or reflection features. In embodiments said characteristic optical information may comprise also intensity and/or optical contrast distributions or comprise polarisation features.

Using different wavelengths and/or polarisation orientations allows to enhance the reliability of the correlation process as described. Particular wavelengths and/or polarisation states of the illuminating light beam of the extremity of an article may be used for providing particular optical properties of the consumable part of the article. Such optical properties may be absorption and/or reflective properties but may also be colour effects or a combination of these effects.

In an embodiment said optical information of the reference image and of said current digitalized image are detected in at least two different wavelength bands. Using at least two wavelengths allow to further increase the reliability of the correlation method as described.

In a second aspect the invention is achieved by an aerosol-generating system, comprising an aerosol-generating device comprising a 2D and/or 3D imager and an aerosol-generating article comprising a substrate formed of individual substrate parts arranged in a stochastic arrangement in at least one consumable section of said aerosol-generating article, said aerosol-generating article having a proximal end and a distal end.

The imager comprises image processing means and image correlation means and is configured to:

form a 2D and/or 3D image of the stochastic arrangement of the individual substrate parts in the consumable substrate at said distal end therein by said imager;

process said 2D and/or 3D image to form a digitalized 2D and/or 3D image representative of the stochastic arrangement of the individual substrate parts of said consumable substrate, said image comprising characteristic optical information of the stochastic arrangement of the individual substrate parts at said consumable section;

correlate said current digitalized image with a reference image of the said consumable substrate in said consumable section registered during production thereof, said reference image comprising also characteristic optical information of the stochastic arrangement of the individual substrate parts at said consumable section, determine, based on the previous correlation results and a predetermined correlation criterium, if the aerosol generating article is a genuine product.

The imager of the aerosol-generating system allows to provide a simple and very reliable system that can be implemented easily in an aerosol-generating device. A similar or even an identical imager may be integrated into or onto a production machine for producing, conveying and packaging consumables so that images taken during the manufacturing process and images taken at the consumption of the article may be easily and quickly correlated and decide in straightforward manner if the article is a genuine product or not.

In an embodiment said imager comprises UV and/or visible and/or infrared and/or polarisation detection and/or microwave and/or capacitive and/or thermal detection means. Imaging may be realized by optical detection means but also by non-optical detection means which further makes the replication of the detection method more complicated, so that the detection reliability is improved. The combination of at least one non-optical and at least one optical detection may be provided which enhance further considerably the reliability of the method of identification of aerosol-generating consumables.

The invention relates also to a consumable package, configured to comprise a plurality of aerosol-generating article and es as described comprising a transparent package bottom layer for aligning the distal ends of said aerosol-generating articles in contact with said bottom layer, said transparent bottom layer allowing to image said distal ends by an imaging system. Providing a package that has at least one transparent bottom allows to implement a simple imaging system in a consumable manufacturing machine, because such imaging system may be arranged in the machine so that it faces the transparent layer and thus the extremities of the consumables. This allows to provide an identification method that may link the individual recognition of individual articles with information provides by the package. In a variant, an imaging packaging system which is arranged to a packaging unit of a consumable manufacturing machine may image as well individual articles as information that is present on a part of the outside or inside of a package. Said information may be an indicium or any sign or symbol that may be arranged in proximity of the transparent layer. Said package may be any type of package and have any outer shape.

The invention relates also to a machine for producing aerosol-generating articles comprising a distribution system to guide fabricated articles and a packaging unit for packaging said articles. The machine comprises at least one in-line imaging system configured for carrying out the method. Said at least one in-line imaging system is arranged to said distribution system and/or to said packaging unit.

BRIEF DESCRIPTION OF THE DRAWINGS

FIGS. 11-16 shows a schematic representation of typical preprocessed images of an end face of an aerosol-generating article;

FIGS. 17-22 illustrate sample images and processed sample images of an end-face of a commercialized aerosol-generating product;

FIG. 23b shows a camera system that is arranged to make images of at least a portion of the transparent bottom of the package of FIG. 23a;

DETAILED DESCRIPTION OF THE INVENTION

Figure 1:
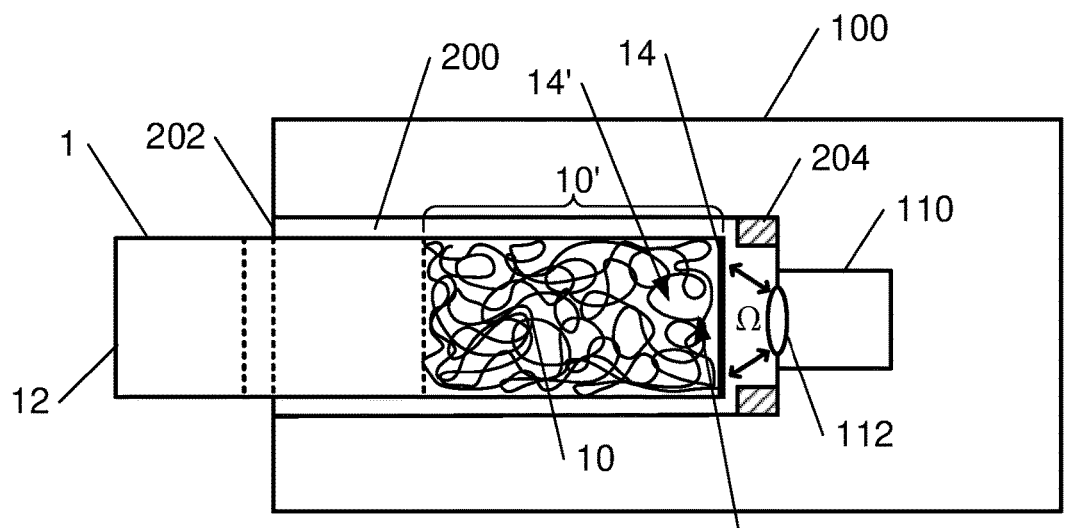
FIG. 1 shows a schematic representation of an embodiment of an aerosol-generating device of the invention, comprising an optical system to detect and process the image of an extremity of a consumable article.
Figure 2A:
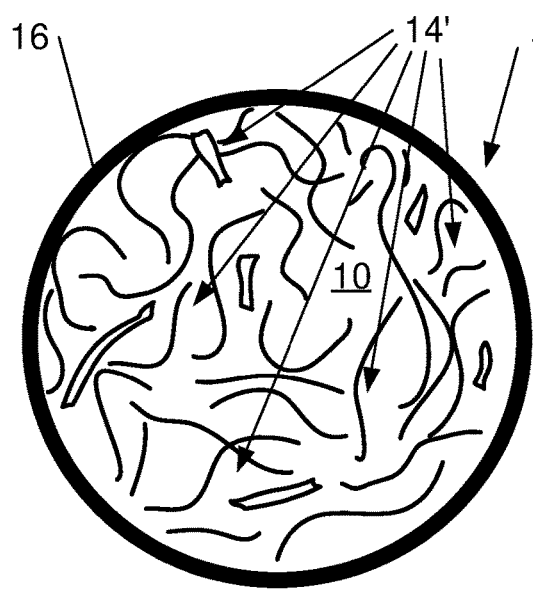
FIGS. 2a and 2b illustrate typical end faces of an aerosol-generating article, the end faces presenting a random arrangement of the constituents of the substrate of the article.
Figure 2B:
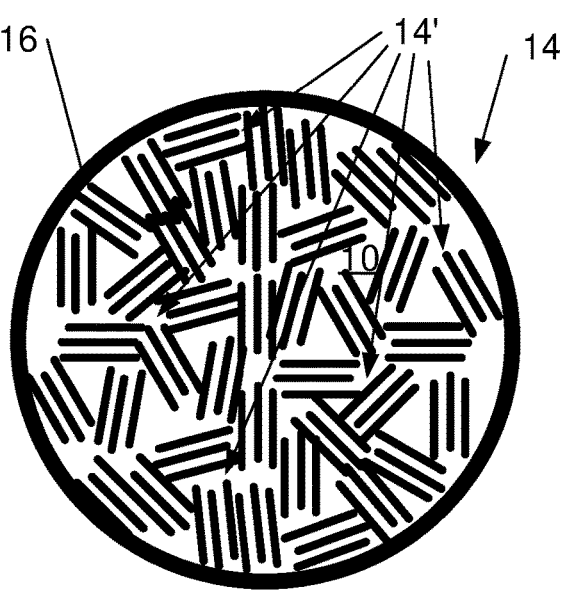

The present invention will be described with respect to particular embodiments and with reference to the appended drawings, but the invention is not limited thereto. The drawings described are only schematic and are non-limiting. In the drawings, the size of some of the elements may be exaggerated and not drawn on scale for illustrative purposes. The dimensions and the relative dimensions do not correspond to actual reductions to the practice of the invention.

The invention will be described in the following examples in relation to tobacco-based consumable articles but the scope of the invention shall not be construed as limited to tobacco based consumable articles but shall encompass any aerosol-generating consumable articles, such as smoking articles, heat-not-burn articles, e-liquid cartridges and cartomizers, which comprises an aerosol-generating substrate capable to generate an inhalable aerosol upon heating. Aerosol-generating articles 1, or articles, of the invention are also defined herein as consumables.

As used herein, the term "aerosol-generating material" refers to a material capable of releasing upon heating volatile compounds, which can form an aerosol. The aerosol generated from aerosol-generating material of aerosol-generating articles described herein may be visible or invisible and may include vapours (for example, fine particles of substances, which are in a gaseous state, that are ordinarily liquid or solid at room temperature) as well as gases and liquid droplets of condensed vapours.

The term "wrapper" is defined broadly as any structure or layer that protects and contains a charge of aerosol-generating material, and which allows to handle them. It has an inner surface that may be in contact with the aerosol-generating material and has an outer surface away from the aerosol-generating material. The wrapper 16 may preferably comprise a cellulose based material such as paper, but may also be made of a biodegradable polymer or may be made of glass or a ceramic. The wrapper 16 may be a porous material and may have a smooth or rough outer surface 5 and may be a flexible material or a hard material.

The manufactured aerosol-generating consumable article 1 may have a cross section of any regular or irregular shape, and can have, for example, an elliptical or circular cross-section, defined in a plane orthogonal to a longitudinal axis.

As used herein, the term "advanced image" or "processed image" means an image that has been modified by simple or complex image processing techniques and may be any image processing technique well known for extracting or enhancing or correlating features of 2D and/or 3D images. There is no limit to any particular image processing or correlation technique. The image processing techniques in the invention may be simple contrast enhancing techniques or very advanced image processing methods such as used in any high security detection systems, for example as used in banking or in fingerprint recognition. As used herein "a template" means a processed reference image or reference frame that is used to be compared or correlated with another processed images.

As used herein the term "constituents" refers to the detailed composition of the aerosol generating substance, for example the fibers of tobacco, but may also be particles in the case of consumables that are based on powders and the like. An aerosol-forming substrate is made of individual substrate parts and may be provided in a stable support. Such a support may be in the form of a powder, granules, small strips or sheets, or any material that presents, at least at an extremity of a consumable a random 2D and/or 3D arrangement, also defined as stochastic arrangement.

As used herein the term "end" or "end portion" means an extremity or portion of the article of which an image is taken during its manufacturing process or before or during its consumption.

FIG. 1 shows an exemplary embodiment of a manufactured aerosol-generating consumable article. The article 1 extends preferably, but not necessarily, along a virtual longitudinal axis Z (FIGS. 17-22) and has a first extremity 12 to the side of the mouthpiece of the article 1 and a second extremity 14, also defined as an end or end portion, opposite to said first extremity. The extremity 14 is preferable the end surface or the volume near that extremity, such as illustrated by the small volume taken by the end constituents 14', as illustrated in FIG. 1. The end portion, which is to be imaged by the imaging system and method of the invention, may have a depth, defined orthogonally to said end 14 smaller than 1 mm, or may be greater than 1 mm, for example 2 to 3 mm. The imaging system has an angular aperture Ω that may be chosen in function of the area that is to be imaged.

In variants the aperture may cover the whole extremity 14 or only a fraction of it. In embodiments the optical system may be configured to adapt the angular aperture Ω, possibly providing a variable focus. The end portion of a consumable 1 is preferably a non-closed end, meaning that the aerosol substance 10 may be observed or detected by a detection system 110 that faces said end 14. In embodiments, as further described in detail, the distribution of the aerosol substance 10 may be detected either by optical, electrical, ultrasonic or thermal detection means. So, the end must not be necessarily be an open end, but may be an end that is, at least partially, closed by any layer, optically transparent or not, through which the detection means may detect the 2D and/or 3D distribution of the aerosol substance, for example the fibers of a tobacco-based aerosol substance, as illustrated in FIGS. 17-22. A consumable article 1 may have a closing window that is added or incorporated to the wrapper 16 of the article 1. Such a variant is not illustrated in the figures.

In a first aspect the invention relies on a method for authenticating an aerosol generating-article 1, said aerosol-generating article 1 comprising a consumable substrate 10 formed of individual substrate parts arranged in a stochastic arrangement.

In a general aspect, the method of the invention is based on the identification of individual aerosol-generating articles 1 during the manufacturing process. The identification is made by image processing and image recognition techniques, not necessarily optical techniques. During the manufacturing process the articles 1 may also be detected during or after their introduction in a package as explained herein. Before the consumption of the article 1, or during a test process of articles 1, an imaging system 110, that is preferably arranged into or associated with an aerosol-generating device 100 makes at least one image of the end portion of the article 1. Its processed image is compared with the image or processed image of its end portion that is taken during the manufacturing process.

Figure 3:
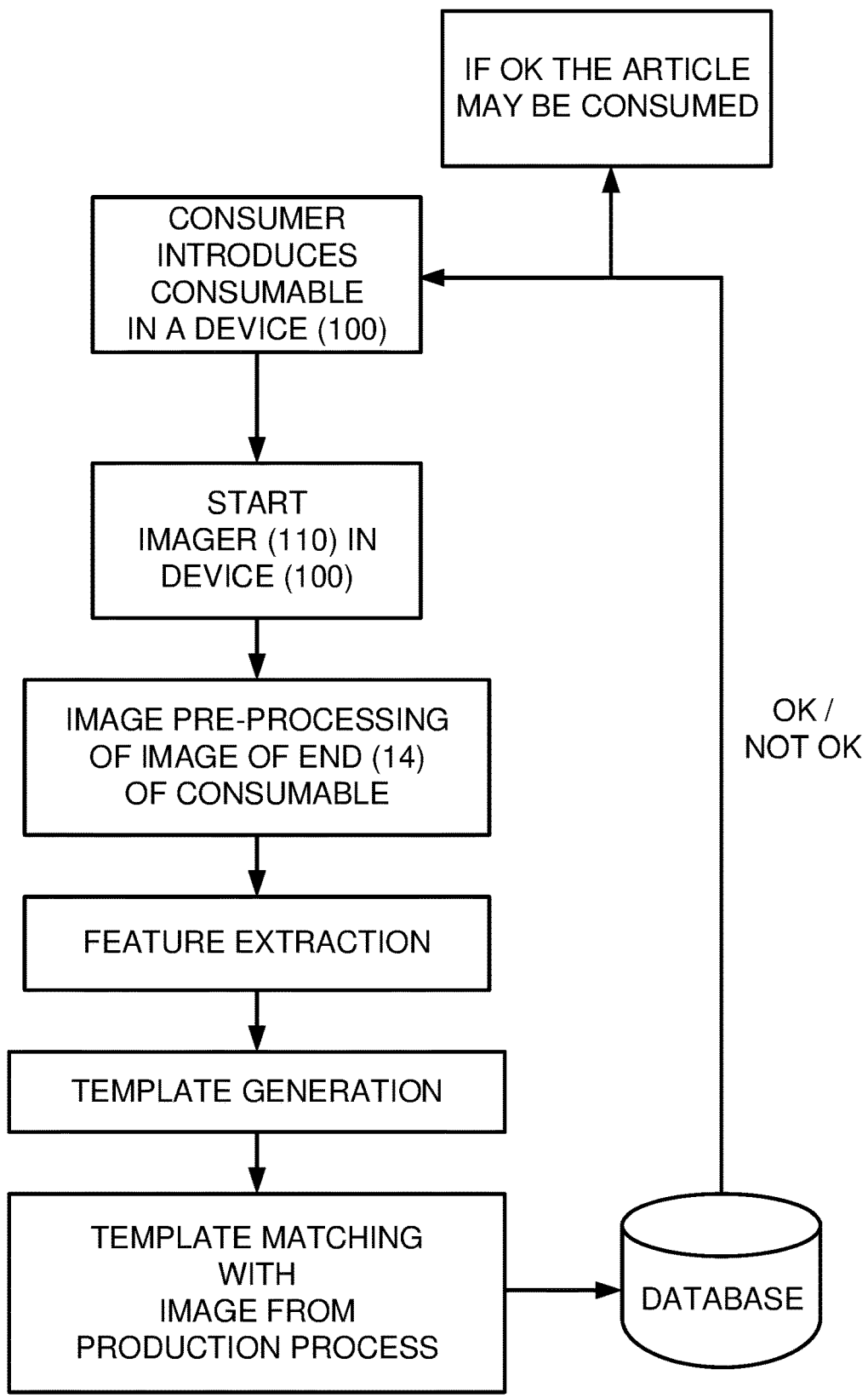
FIG. 3 illustrates schematically an embodiment of the method of detection and correlation of images according to the invention.

More precisely, the method of the invention is schematically illustrated in FIG. 3 and comprises the steps of:
providing an imager 110 comprising image processing means and image correlation means,
imaging the consumable substrate in said at least one consumable section 10' of the aerosol-generating article to form a 2D and/or 3D image of the consumable substrate therein by said imager 110,
processing, by said image processing means, said 2D and/or 3D image to form a digitalized 2D and/or 3D image representative of the stochastic arrangement of the individual substrate parts of said consumable substrate 10, said image comprising characteristic optical information of the stochastic arrangement of the individual substrate parts at said consumable section,
correlating, by said image correlation means, said current digitalized image with a reference image of said consumable substrate in said consumable section registered during production thereof, said reference image comprising also characteristic optical information of the stochastic arrangement of the individual substrate parts at said consumable section,
determining, based on the previous correlation results and a predetermined correlation criterion, if the aerosol generating article 1 is a genuine product.

The correlation step typically comprises the creation of a template that is used as a reference. The template may be a simple template or a template that comprises a dense network of reference features. For example, a processed image of an end 14 of a consumable 1 may be converted into a frame that comprises a number of straight or curved lines 14e or areas 14a-14d and the number, the thickness and/or the orientation of these lines are used as reference in the correlation process. An example of such reference templates is illustrated in FIGS. 11 and 12.

The method of the invention relates preferable as well to optical, capacitive, ultrasonic, thermal image detection techniques, or a combination of them.

In variants, upon predetermined criteria, the image correlation process may be repeated at least two times, for example when the comparison steps leads to a criterium that is judged not enough reliable. The comparison criteria are established for each type of consumable and may be very different according to the statistical properties of the constituents of the consumable substrates 10. Comparison criteria may also rely on machine learning techniques.

A stochastic image sensor 110 is generally associated with a powerful DSP that performs the picture handling, the counting, including image operations such as finding and seeking.

In the image pre-processing, pre-handling image processing steps are preferably performed in attempts to make up for the varieties in lightning, differentiating different irregularities which are presented by the sensors image acquisition process. Typical pre-processing step examples are:

re-sampling to assure the image coordination system is correct;
noise-reduction to assure that sensor noise does not introduce false information;
contrasts enhancement to assure that relevant information can be detected (ex. In FIG. 17-18);
Scale space representation to enhance image structures at locally appropriate scales.

The step of pre-processing comprises preferably a binarization of the preprocessed image. In variants, colour shades may be compared in the process of the correlation of the sample and production images.

The step of pre-processing may comprise also preferably a step of thinning, which consists in reducing the lines or ridges. The use of a "thinning algorithm" allows to preserve for example the connectivity of ridge structures of the substrate 10 while forming a skeletonized version of the binary image. Such skeleton image may be used to extract minutiae.

Typical features to be extracted from the images are: lines, edges, ridges and localized interest points such as corners, blobs or points. Feature extraction techniques are well known in the field of 2D and 3d image processing and are not further described here. It is referred here to publications that are incorporated in their entirety here:

R. Szeliski, *Computer vision: Algorithms and Applications*, Springer Verlag, 2010, ISBN 978-1848829343;
J. R. Parker, *Algorithms for image processing and Computer Vision* ($2^{nd}$ ed.), Wiley, 2011, ISBN 978-0470643853;
N. Mark, A. Aguado, Feature Extraction and Image Processing for Computer Vision (4th ed.), Academic Press, 2019, ISBN 978-0128149768.

An example, out of a huge number of possible feature extraction techniques, is the following: in the step of feature extraction, subtle details may be accentuated or removed by filtering the nearby neighbourhood of each edge pixel in the picture. The most ordinary and preferred technique for such feature extraction consists in using crossing numbers (Cn). Crossing numbers is a known number system in image processing that links a number with specific features. For example, an ending of a ridge may be attributed Cn=1, a normal ridge Cn=2, a bifurcation of a ridge Cn=3.

After pre-processing and feature extraction, at some point in the processing a decision has to be made about which image points or regions of image are relevant for further processing. Such decision is made upon well-known properties of typical statistical distributions of the substrate constituents 14' of articles 1.

After the generation of a template, the features of the image taken during the production process, defined as reference image or production image, and the sample image taken before or during the consumption of a consumable 1 have to be matched. Matching may be performed by comparing shapes, depths, areas or intensity effects. Matching is typically based on the correlation of at least one of: minutia, lines or ridges or black and white areas, 3D features (depth at a pixel for example), number of bifurcations, or a combination of them. Matching of 2D and 3D images is a well-known technique and is not further described here in detail.

In variants, matching of images may be performed by comparison of mean colours or mean intensities. For example, in certain stochastic distributions, the density of fibers may be greater near the wrapper 16 than in the center part. The image processing method may transform such information in for example two bands having different contrasts, colours or intensities as illustrated in FIG. 14, and this transformed image is then used as a simple template for the correlation test step.

The main general difference between possible detection and imaging techniques of the invention are now briefly discussed.

Optical techniques are based by the use of a light source and detector to provide an advanced image of an end 14 of a consumable 1. The image may be a 2D and/or a 3D image. The type of camera 110 that is used is a particular kind of computerized camera that comprises imaging optics 112, such as a lens or objective, or curve mirror and an imaging detector connected to imaging processing means of which a part may be integrated into the imaging detector.

Light sources may be CW or pulsed LED's or semiconductor lasers or a UV or infrared light source. Light may be provided to the end portion of a consumable 1 by providing a light source which emitted light beam is transmitted to said end portion by using an optical waveguide. Such variants are not shown in Figures herein. It is understood that the imaging optics 112 may comprise lenses, mirrors, prisms or any optical component that is configured to transmit light to and/or from the end of a consumable 1.

In the optical embodiments, the light is reflected from at least a portion of the end of the aerosol-generating substance. The reflected and/or diffused light is provided by the interaction of the incident illumination light-beam with the edges, valleys and surface shapes of the constituents 10 of the aerosol-generating substance, such as tobacco fibers. Said constituents 10 may also be in the form of a powder or any substance that has a stochastic distribution of its composition. It is understood that, in function of the used wavelengths and the specific properties of the substrate 10 of the consumable 1, that incident light may penetrate the substrate 10 over a certain depth. In variants, the consumable 1 may be separated from the imaging system 110 by a filter and/or a window. Such possible, but not necessary, optical separation element may be arranged, as illustrated schematically by the thick line in FIG. 1, so that it forms a window against which a consumable 1 is pushed before its consumption.

Capacitive detection methods may be deployed and are based on a capacitive coupling that may measure and recognize any substance that is at least conductive or that has a dielectric.

Ultrasonic imaging techniques may also be used, as they allow to recognize the components of the aerosol-generating substance by sending a sound wave at a particular frequency and tuning that frequency in for the sound wave's reflection.

Thermal imaging may be deployed also and are similar to optical techniques, with the difference that thermal effects are detected. The heater in an aerosol-generating device may be used to generate the heat source to provide an infrared image.

It is generally understood here that any image processing techniques may be used, for example Fast Fourier Transform techniques. Image processing techniques to detect characteristic features in an image have been widely developed in the past, mainly in the field of advanced photography and are not further described here.

Some typical, non-exclusive, feature extraction techniques are commented hereafter.

Figure 4:
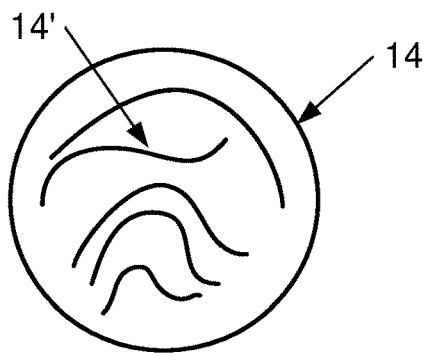
FIGS. 4-10 shows schematically typical types of classes of stochastic distributions of arrangements of fibers of a consumable.
Figure 5:
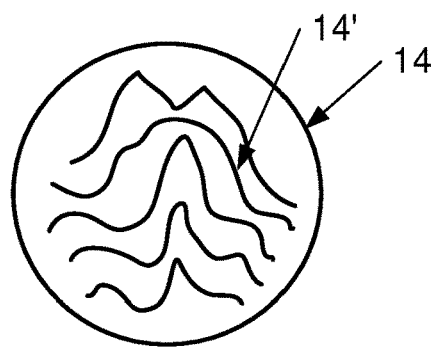
Figure 6:
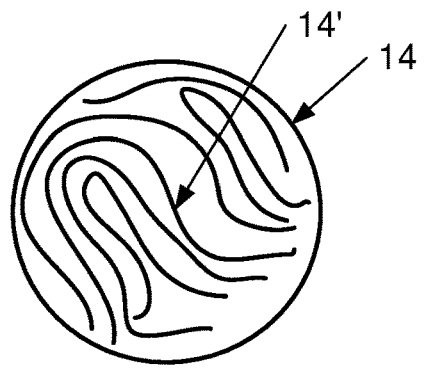
Figure 7:
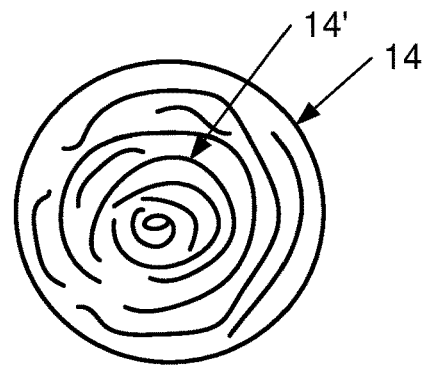
Figure 8:
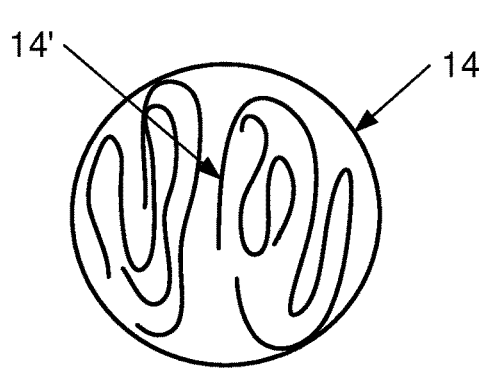
Figure 9:
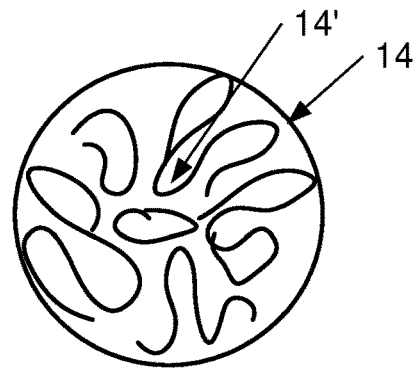
Figure 10:
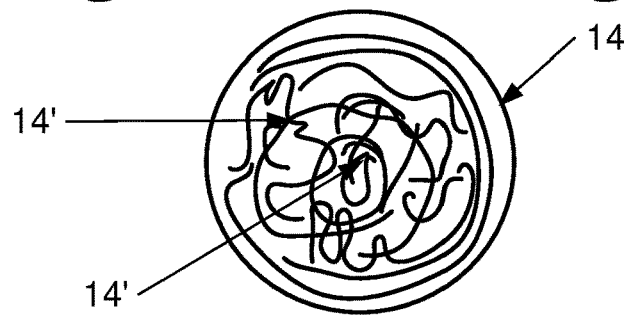

The components of an aerosol-generating substance are typical mm, or sub-mm or micrometer-sized elements. The stochastic distribution of the constituents 14' of the substrate 10 of an aerosol generating article 1 may be roughly classified into some typical classes that are mainly based on the shape and distribution of edges of dark ridges and/or areas. and valleys of bright lines and/or or areas:
- arc-type distributions (FIG. 4), i.e. distributions in the form of arcs;
- tentarch distributions (FIG. 5), i.e. distributions having a peak located in the arcs;
- loop or double loop distributions (FIGS. 6 and 8), i.e. distributions comprising loops or portions of loops;
- pocked loop distributions (FIG. 9), i.e. loop distributions having a central area or shape;
- whirl distributions (FIG. 7): i.e. distributions presenting angular shapes arranged around the center;
- or a combination of the above distributions or chaotic distributions (FIG. 10).

Typical feature extraction techniques are the following, but not exclusively: minutiae extraction, ridge and valley detection, orientation extraction. They are briefly described hereafter.

Minutiae extraction: this technique relies on particular image extraction strategies and are based on the detection of small distributed features. Such techniques may require an image system that may detect micrometer-sized structures typically between 10 and 100 μm. Minutiae may be the extremity of edges or ridges, or small dots or surface details of for example tobacco fibers. For example, ridge bowing may be detected, or widths and edge breaks and edge bifurcations. Such features may be removed from an image during said pre-processing step as they may contain fake details. Techniques for the detection of minutiae are used in different image recognition fields, mainly security fields and robotic imaging and is described in for example the following publication that is incorporated herein in its entirety:

B. Nagpal et al., Analysis of fingerprint recognition methods in biometric security system, IJEAT, ISSN 2249-8959, vol-I; Issue 1, October 2015, pp. 83-86.

In variants, simple contrast enhancement techniques may be used so as to remove grey areas and provide very contrasted black-white images as illustrated in the FIGS. 18, 20, 22 that are contrast-enhanced picture of the images of FIGS. 17, 19, 21.

Edge detection: the main property of the edges in the distribution of aerosol-generating substance elements is that the dark level esteems on edges provide a simple and quite reliable first information of the stochastic distribution and may be used as such, i.e. without further image processing complexity.

Orientation detection: the relative orientation of features may be detected. For example, the detection of an edge or dot relative to a loop having a specific shape.

In an embodiment, the imager 110 is provided in a cavity 200 of an authentication device 100. This cavity 200 is defined by a cavity opening 202 and a cavity end 204, opposite to said opening 202. The aerosol-generating article 1 is introduced in the cavity 200 such that said consumable section is positioned in proximity of said imager 110.

In an embodiment the authentication device is an aerosol-generating device 100 and the cavity 200 is a heating cavity of said aerosol-generating device 100.

In an embodiment, the aerosol-generating article 1 has an elongated shape with a proximal end 12 and a distal end 14, said consumable section 10' comprising the distal end 14, and wherein the 2D and/or 3D image of the consumable substrate is an image of said distal end 14 of the consumable section of the article. It is understood that the focus plane of the imaging system may be coincident with the distal end, 14 but may also be situated in proximity of the distal end, depending for example on the wavelength that is used. In embodiments, for example by using two different wavelengths, the imaging system may provide 2 2D or 3D images of at least two different cross section in the aerosol-generating article 1 and in proximity of said distal end 14.

In an embodiment, the consumable section 10' has a t least one adhesive seam presenting a seam end portion at said distal end 14, and the method comprises the further steps of:
- detecting the angular position Θ, in an X-Y plane, of said seam end portion,
- using the detected angular position Θ of said seam end portion to provide an angular corrected image of the distal end 14 of said consumable article 1.

In an embodiment, said consumable substrate 10 comprises tobacco, in particular tobacco cut-filler and/or reconstituted tobacco.

In an embodiment, the consumable substrate 10 comprises an insert I (FIG. 13) and the method comprises a step of identifying the presence and the 2D (X-Y) orientation of said insert I at said distal end 14 (FIG. 13).

In an embodiment, said insert I is a conductive thread arranged in or on said at least one layer of said consumable 1.

In an embodiment, said characteristic optical information comprises UV and/or visible and/or infrared transmission and/or reflection features.

In an embodiment, said characteristic optical information comprises intensity distributions.

In an embodiment, said characteristic optical information comprises polarization features.

In an embodiment, said optical information of the reference image and of the digitalized image of the sample are detected in at least two different wavelength bands.

Figure 24:
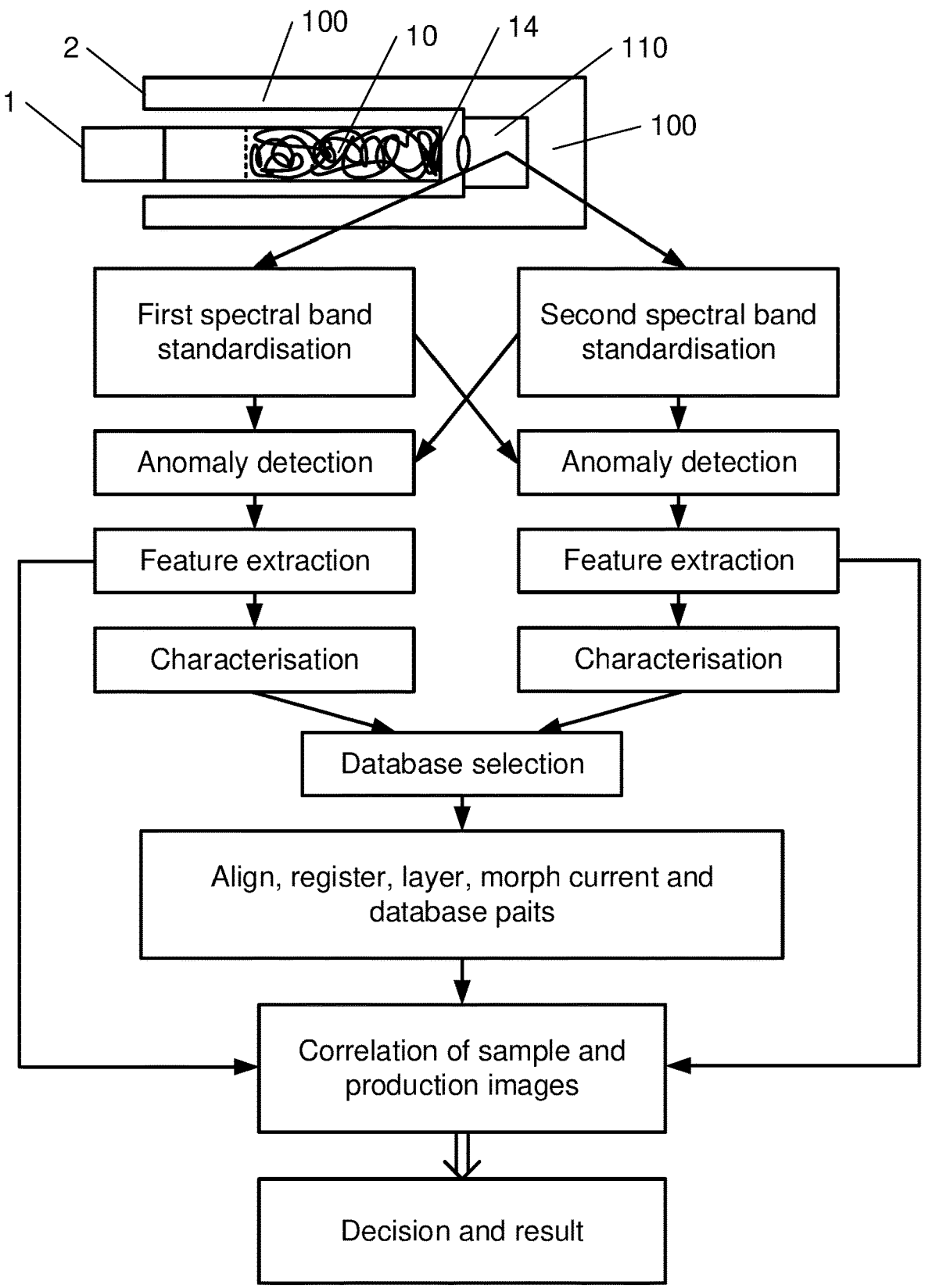
FIG. 24 shows a block diagram of an embodiment of the method of the invention, relying on a dual spectral band detection configuration.

FIG. 24 illustrates a block diagram of possible image processing and correlation steps in the case of a dual wavelength band detection system and method. By using different wavelength, the correlation detection may be considerably improved. In variants optical imaging techniques may be combined with other imaging or detection techniques of the end portion of a consumable 1.

In embodiments, the image processing imager 110 may comprise processing algorithms that may correct for deformations of a consumable 1. As illustrated in a typical example in FIGS. 17, 19 and 21, it may be seen that, at least in the case of tobacco substrates, the statistical arrangement of the fibers 14' remain identical. Indeed, FIG. 19 illustrates a deformed sample of FIG. 17, by applying a lateral force F. By applying another force orthogonal to said deformation force, the sample 1 takes back its initial form as illustrated in FIG. 21. Due to the flexibility of the fibers 14', their statistical distribution remains substantially identical. This implies also that, by using image processing techniques, the shape of deformed sample (FIG. 19) may be corrected by using algorithms so as to provide a reconstituted image that is equivalent of a non-deformed sample.

Also, image processing techniques allow to correct for the angular orientation of the consumable. Depending on the required correlation probabilities, and the speed of the correlation test, the imager 110 may provide a number of 10, 100, 1000 or 10000 of angular correlation tests, which allows to provide a system that does not require any angular orientation of a consumable 1 in a device 100. In order to speed up considerably the correlation process, an angular reference may be used, such as the border of a seam or the orientation of an insert that is inside a consumable. As an example, a T-shaped insert is illustrated in FIG. 13.

Figure 25:
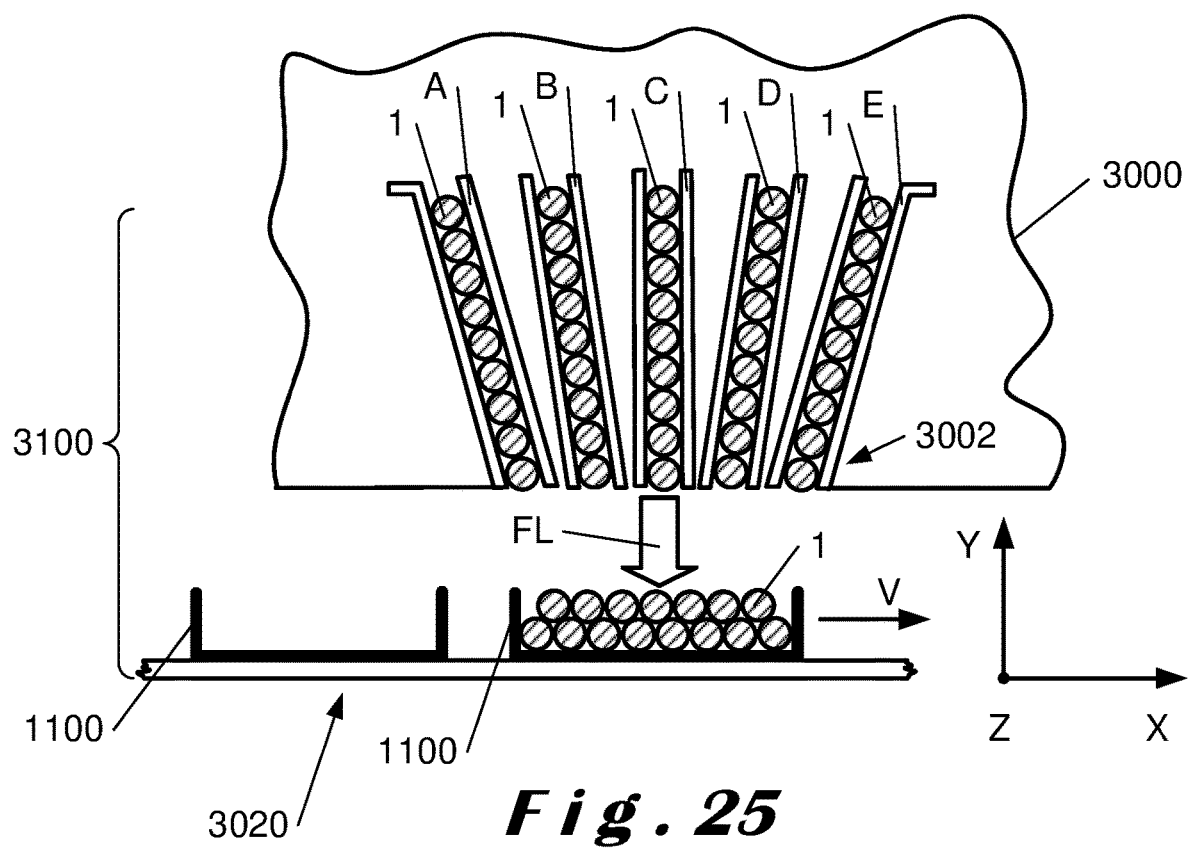
FIGS. 25 and 26 illustrates a part of a production machine for fabricating aerosol-generating articles. The machine comprises a unit for conveying and packaging articles, and comprises at least one imager for imaging the extremities of the articles.
Figure 26:
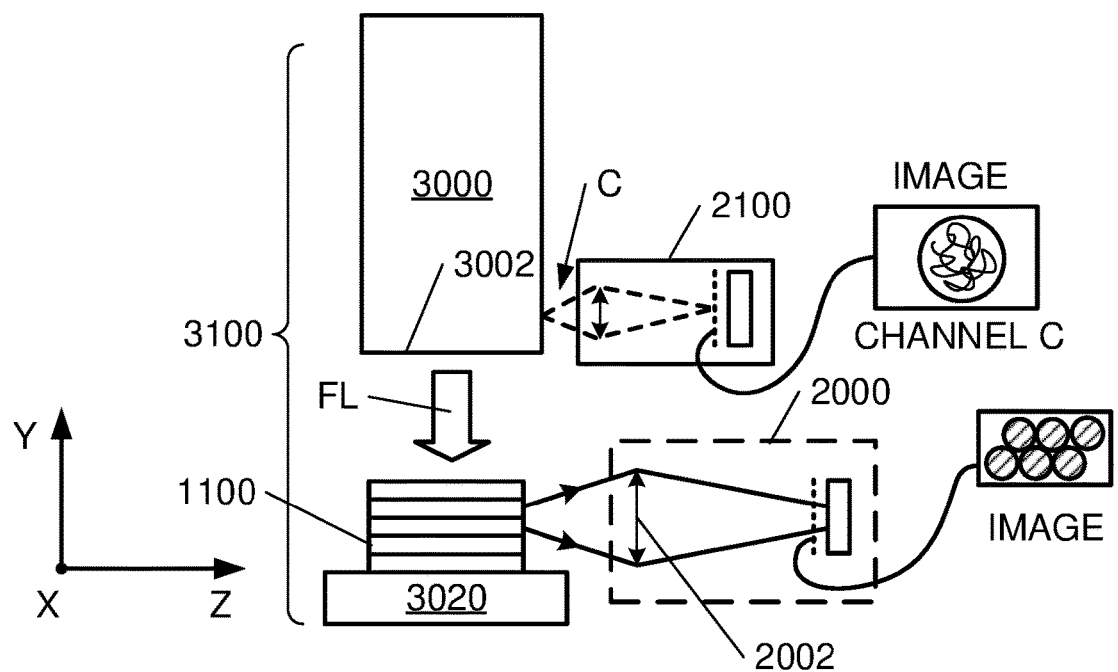

In advantageous embodiments, the described steps of taking images, processing them and realizing reference templates, may be performed either during the in-line processing of consumables 1 or they may be performed by a packaging imaging system during the packaging process as described further and illustrated in FIGS. 25 and 26.

In a second aspect the invention provides an aerosol-generating system, comprising an aerosol-generating device 100 comprising a 2D and/or 3D imager 110 and an aerosol-generating article 1 comprising a consumable 1 having a proximal end 12 and a distal end 14.

The imager 110 comprises image processing means and image correlation means for imaging and analysing the distal end 14 of said consumable 1. The consumable substrate 10 has a stochastic arrangement of its constituents 14' such that said stochastic arrangement is readable with said imager 110 upon illumination of said distal end 14.

In an embodiment, said imager 110 comprises UV and/or visible and/or infrared and/or polarisation detection means.

In embodiments, the imager 110 is a capacitive, or ultrasonic, or thermal imager. In variants, the imager 110 may be configured to perform at least two of said detection techniques.

In an embodiment, said imager 110 is a multi-spectral band optical imager. In variants, the imager 110 may comprise a variable focus system allowing to make images at different planes in proximity of said distal end 14.

It is generally understood herein that the detection method and detection system may be configured to detect features that are not at all visible to the human eye. It is also understood that a wide variety of particles or substances may be incorporated into the aerosol-generating substance in order to make the identification process more reliable. For example, light diffusion particles may be incorporated into at least a portion of the aerosol-generating substance 10. Such added particles or substances must not be distributed homogeneously into a consumable 1 and may be concentrated to the distal end 14 of the consumable 1.

Another aspect of the invention relates to an new package 1000 that not only has an interesting attractive design aspect, but at the same time allows also to detect the stochastic arrangement of individual substrate parts 14' of the consumable portion of an aerosol-generating article (1).

Figure 23A:
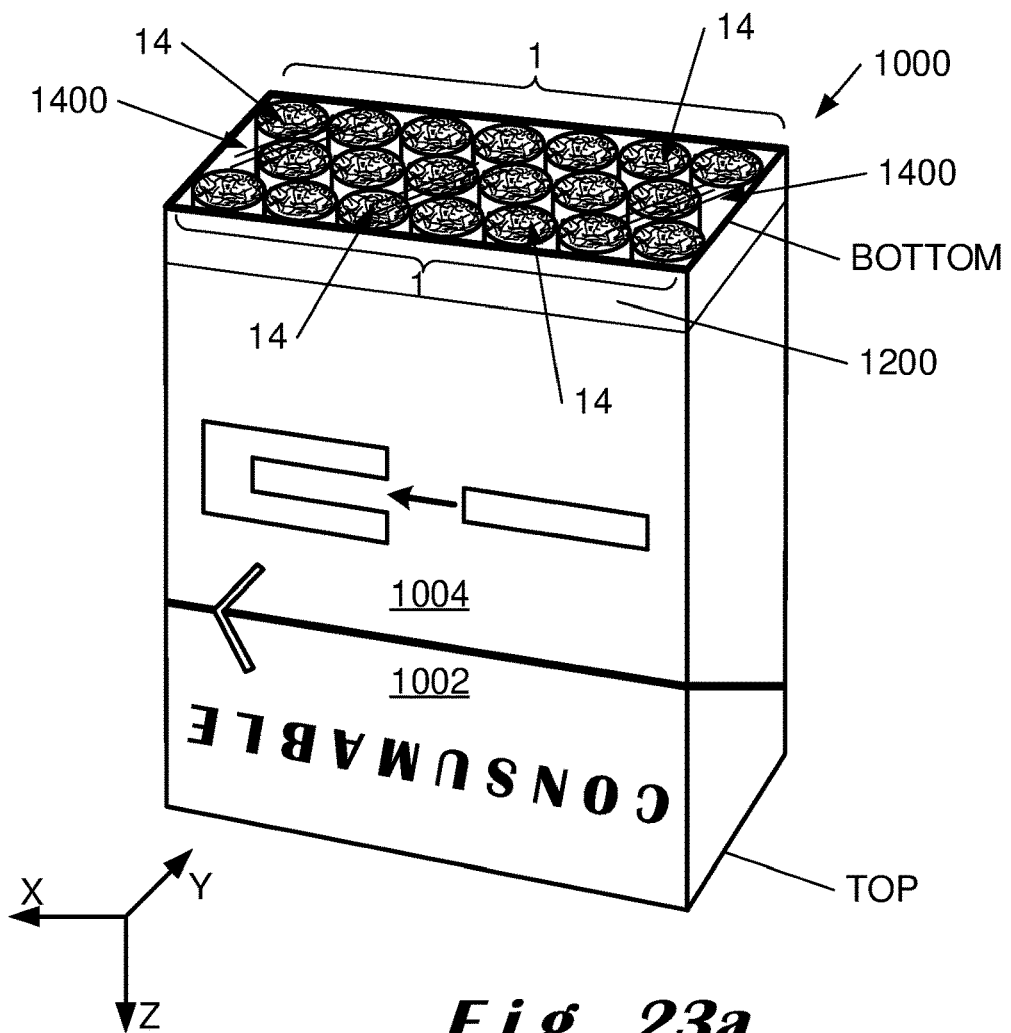
FIG. 23a shows schematically a new and visual attractive package that comprises a transparent bottom layer to visualize end portions of consumables.
Figure 23B:
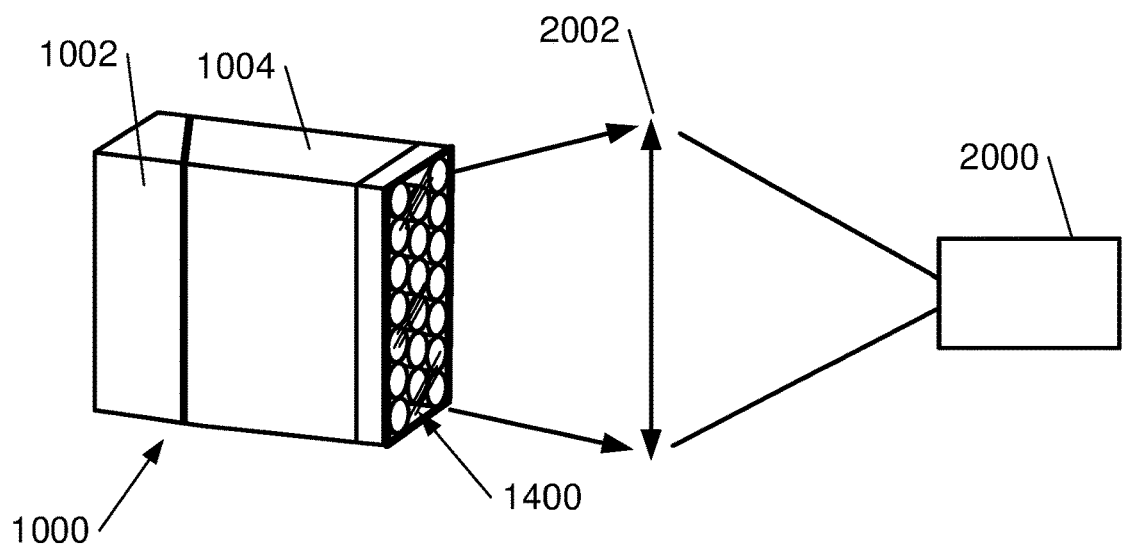

The package 1000 for packaging consumables 1, illustrated schematically in FIG. 23a, comprises at least one transparent package bottom layer 1400 for aligning the distal ends 14 of aerosol-generating articles 1. Preferably the articles 1 are placed in contact with said bottom layer 1400. The transparent bottom layer 1400 allows to image at least one of said distal ends 1 by an imaging system 2000 as illustrated in FIG. 23b.

The package 1000 comprises typically two parts 1002, 1004 for opening the package 1000 and introducing the articles 1. Different variants of a transparent bottom layer 1400 may be conceived. The bottom layer 1400 may be part of a folded layer 1200 that may be folded inside or outside the package.

The package 1000 may be particularly interesting to track the origin of articles 1. Indeed, articles 1 may be identified during their production process but they may also be identified before or after the closure of a package. An imaging system 2000 as illustrated in the example of execution in FIG. 23b may image in a single image all the ends 14 of the article. In variants, the camera may image different bottom layers of different packages at the same time, for example 5 packages 1000, so as to enhance the detection and identification speed. The imaging system 2000 may be configured to provide also a magnified image of each of the distal ends 14 of the articles.

The invention relates also to a production machine 3100 to produce aerosol-generating articles 1 Such production machine 3100 comprise typically a distribution system 3000 comprising a plurality of channels (A-E) to guide fabricated articles 1 towards an end 3002, defined as exit side, that faces a packaging unit 3020, which is typically a laterally moving system, the movement being illustrated by the symbol V in FIG. 25. The invention relates also to such machines that comprise furthermore at least one in-line imaging system 2100 to image and recognize the extremities 14 of the articles 1. More precisely such imaging system 2100 is configured to make 2D and/or 3D image to form, as described herein, a digitalized 2D and/or 3D image representative of the stochastic arrangement of the individual substrate parts of said consumable substrate 10. In the use of an aerosol generating article, as described herein, a digitalized image of the distal end of an aerosol generating article 1 is compared with a reference image of said consumable substrate 10 in said consumable section registered during production thereof by the production machine 3100. In embodiments each channel (A-E) may be associated with an in-line imaging system 2100. In variants, the imaging system 2100 may be configured to take an image, at the same time and/or in a single frame, of all the extremities 14 located at said exit side 3002.

The invention relates also to an embodiment of the machine 3100 for producing aerosol-generating articles 1, that comprises a packaging imaging system 2000 arranged at the level of the packaging unit 3020, as illustrated in FIG. 25 and FIG. 26. The flow FL and introduction of articles 1 from the channels A-E to the packages 1000 is not illustrated in detail the figures. The packaging imaging system 2000 is also arranged for detecting 2D and/or 3D image to form, as described herein, a digitalized 2D and/or 3D image representative of the stochastic arrangement of the individual substrate parts of said consumable substrate 10.

In embodiments said in-line imaging system 2100 and/or said packaging imaging system 2000 may be configured to image more than one extremity 14 of an article 1. In variants, a packaging imaging system 2000 may be configured to take the image of a complete set of extremities 14 of articles 1, as illustrated in FIG. 26. Preferably, the images taken of the extremities 14 by said packaging machine 3100 are taken before the completion of the packaging of the articles, as illustrated in the embodiment of FIG. 26. In variants, the finished package may have a transparent bottom (FIG. 23*a*) and said images may be taken through said transparent bottom as illustrated in FIG. 23*b*.

In a variant, an imaging packaging system, arranged to a packaging unit of a consumable manufacturing machine, may be configured to image as well individual articles and information that is present on a part of the outside or inside of a package. Said information may be an indicium or any sign or symbol that may be arranged in proximity of the transparent layer. Said package may be any type of package and have any outer shape or be made out of any material.

It is understood that different numbers and/or types of imaging systems 2000, 2100 may be arranged according to different configurations in said production machine 3000. For example, at least a portion of said imaging systems 2000, 2100 may be integrated in said channels A-E and/or onto said packaging unit 3020.

The invention claimed is:

1. A method for authenticating an aerosol-generating article, said aerosol-generating article comprising a consumable substrate formed of individual substrate parts arranged in a stochastic arrangement in at least one consumable section of said aerosol-generating article,
wherein the method comprises the steps of:
providing an imager comprising image processing means and image correlation means,
imaging the consumable substrate in said at least one consumable section of the aerosol-generating article to form a base 2D and/or 3D image of the consumable substrate therein by said imager,
processing, by said image processing means, said base 2D and/or 3D image to form a digitalized 2D and/or 3D image representative of the stochastic arrangement of the individual substrate parts of said consumable substrate, said digitalized image comprising characteristic optical information of the stochastic arrangement of the individual substrate parts at said at least one consumable section,
correlating, by said image correlation means, said digitalized image with a reference image of the consumable substrate in said at least one consumable section registered during production thereof, said reference image also comprising characteristic optical information of the stochastic arrangement of the individual substrate parts at said at least one consumable section, and
determining, based on a result of the step of correlating and a predetermined correlation criterium, if the aerosol generating article is a genuine product.

2. The method according to claim 1, wherein the imager is provided in a cavity of an authentication device, said cavity being defined by a cavity opening and a cavity end opposite to said opening, and wherein the aerosol-generating article is introduced in the cavity such that said at least one consumable section is positioned in proximity of said imager.

3. The method according to claim 2, wherein the authentication device is an aerosol-generating device and the cavity is a heating cavity of said aerosol-generating device.

4. The method according to claim 1, wherein the aerosol-generating article has an elongated shape with a proximal end and a distal end, said at least one consumable section comprising the distal end, and wherein the base 2D and/or 3D image of the consumable substrate is an image of said distal end of the at least one consumable section of the article.

5. The method according to claim 4, wherein the at least one consumable section of the aerosol-generating article has an adhesive seam presenting a seam end portion at said distal end, the method comprising the further steps of:
detecting an angular position of said seam end portion,
using the detected angular position of said seam end portion to provide an angular corrected image of the distal end of said aerosol-generating article.

6. The method of according to claim 4, wherein the consumable substrate comprises an insert, the method comprising a step of identifying a presence and a 2D (X-Y) orientation of said insert at said distal end.

7. The method of according to claim 6, wherein said insert is a conductive thread arranged in or on said aerosol-generating article.

8. The method according to claim 1, wherein said consumable substrate comprises tobacco.

9. The method according to claim 1, wherein said characteristic optical information of the digitalized image and/or of the reference image comprises UV and/or visible and/or infrared transmission and/or reflection features.

10. The method according to claim 1, wherein said characteristic optical information of the digitalized image and/or of the reference image comprises intensity and/or optical contrast and/or polarisation distributions.

11. The method according to claim 1, wherein said characteristic optical information of the reference image and of said digitalized image are detected in at least two different wavelength bands.

12. The method according to claim 1, wherein said consumable substrate comprises tobacco cut-filler and/or reconstituted tobacco.

13. An aerosol-generating system, comprising an aerosol-generating device comprising a 2D and/or 3D imager and an aerosol-generating article comprising a consumable substrate formed of individual substrate parts arranged in a stochastic arrangement in at least one consumable section of said aerosol-generating article, said aerosol-generating article having a proximal end and a distal end,
wherein
said imager comprises image processing means and image correlation means and is configured to:
form a 2D and/or 3D image of the stochastic arrangement of the individual substrate parts in the consumable substrate at said distal end therein by said imager,
process said 2D and/or 3D image to form a digitalized 2D and/or 3D image representative of the stochastic arrangement of the individual substrate parts of said consumable substrate, said digitalized image comprising characteristic optical information of the stochastic arrangement of the individual substrate parts at said at least one consumable section,
correlate said digitalized image with a reference image of the consumable substrate in said at least one consumable section registered during production thereof, said reference image also comprising characteristic optical information of the stochastic arrangement of the individual substrate parts at said at least one consumable section, and
determine, based on correlation results of the digitalized image with the reference image and a predetermined correlation criterium, if the aerosol generating article is a genuine product.

14. The aerosol-generating system according to claim 13, wherein said imager comprises UV and/or visible and/or infrared and/or polarisation detection and/or microwave and/or capacitive and/or thermal detection means.

15. A consumable package, configured to include a plurality of aerosol-generating articles according to claim 12, comprising a transparent package bottom layer for aligning the distal ends of said plurality of aerosol-generating articles in contact with said bottom layer, said transparent bottom layer allowing imaging of said distal ends by an imaging system.

16. A machine for producing aerosol-generating articles comprising a distribution system to guide fabricated articles and a packaging unit for packaging said articles, the machine comprising at least one in-line imaging system configured for carrying out the method of claim 1, said at least one in-line imaging system being arranged to said distribution system and/or to said packaging unit.

* * * * *